May 2, 1950  C. S. SALVESEN  2,505,916
APPARATUS FOR TREATING LIQUIDS
Filed June 24, 1947
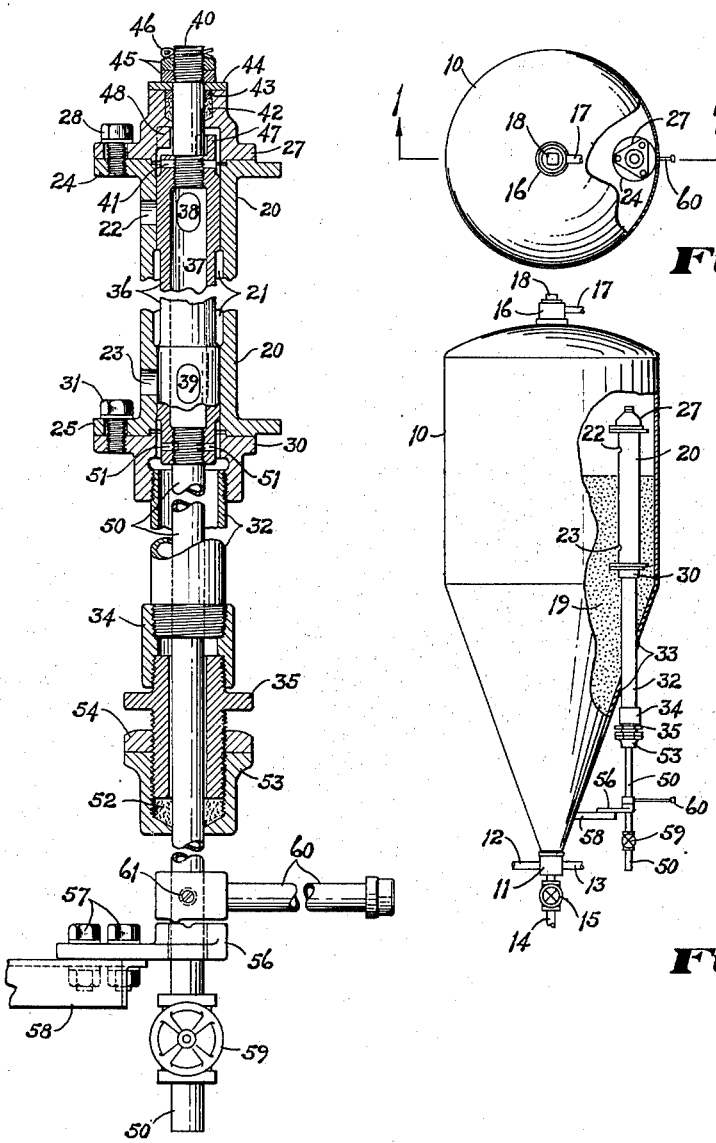
CHARLES S. SALVESEN
INVENTOR.

Patented May 2, 1950

2,505,916

UNITED STATES PATENT OFFICE 2,505,916

APPARATUS FOR TREATING LIQUIDS

Charles S. Salvesen, West Englewood, N. J., assignor to The Permutit Company, New York, N. Y., a corporation of Delaware Application June 24, 1947, Serial No. 756,639

6 Claims. (Cl. 210—16)

This invention relates to apparatus for treating liquids by passage through a bed of granular contact material. It is more particularly directed to determining the quantity of such contact material in the bed, all as more fully described and as claimed hereinafter.

This invention is an improvement on an apparatus such as that disclosed in U. S. Patent 2,259,717 of Egon Zentner dated October 21, 1941, for Process of softening water. In such process, water and a solution of suitable chemicals, such as lime, are mixed and passed upwardly through a conically shaped tank containing finely granular contact material. During such flow the hardness-forming constituents in the water are usually precipitated as calcium carbonate, and such calcium carbonate is precipitated or crystallized onto the granules of the contact material without cementing these granules together. As the process of softening water proceeds, the granules become larger by reason of the matter precipitated or crystallized thereon, and when they become too large to be satisfactory for further use, they are removed and the tank is re-charged with fine granular material. It has been found advantageous to remove from time to time merely a portion of the enlarged contact material, and replace it by a smaller quantity of new contact material of smaller grain size, rather than to remove and replace all the old contact material as a batch.

In order to assure satisfactory functioning of the water softening process, it is necessary that there be not less than a minimum quantity of granular contact material present so as to insure sufficient time of contact for effective precipitation of the hardness from the water. On the other hand, it is also important that the contact material be not allowed to grow to such extent that it would fill the entire tank, it being desirable to have a rising space above the granular contact material.

It is the object of this invention to provide convenient and effective means permitting the operator to maintain the top of the bed of granular contact material between predetermined upper and lower limits.

The manner in which this object is achieved is shown in the appended drawing in which:

Fig. 1 is an elevational view partly in cross-section along line 1—1 of Fig. 2, of a water softening apparatus in which my invention is incorporated;

Fig. 2 is a plan view of the apparatus of Fig. 1 with a portion of the top broken away; and Fig. 3 is a fragmentary view, on an enlarged scale, partly in cross-section along line 1—1 of Fig. 2.

Like numerals refer to like parts throughout the several views.

As shown in Fig. 1, the apparatus comprises a tank 10 which has a lower conical portion and an upper cylindrical portion. As an alternative, the entire tank may be of conical shape as shown in said Zentner Patent 2,259,717. Attached to the bottom of the tank is a fitting 11 to which are connected an inlet 12 for water to be softened, an inlet 13 for chemical solution and a drain 14 provided with a valve 15. Attached to the top of the tank 10 is a fitting 16 provided with a removable plug 18, and to which is connected an outlet 17 for softened water. Within tank 10 is a bed 19 of granular contact material which may be marble, dolomite, gravel, sand, alkaline earth phosphate, or the like.

Within the tank 10 is a body 20 with a cylindrical bore 21 extending through its entire length and provided with an upper port 22 and a lower port 23, both extending through the wall of body 20 into the bore 21. The body 20 is also provided at its upper end with a flange 24 and at its lower end with a flange 25.

To the flange 24 is attached a cap 27 by means of screws 28, and attached to flange 25 is another flange 30 by means of screws 31. Into the flange 30 is screwed a pipe 32 which is welded into the conical portion of tank 10 as shown at 33 in Fig. 1. The lower end of pipe 32 projecting to the outside of the tank terminates in a coupling 34 into which is screwed a hollow closure 35.

Within the bore 21 is a loosely fitted rotor 36 which has a central passage 37. In the rotor 36 are provided an upper port 38 and a lower port 39 in the horizontal planes of ports 22 and 23, respectively, and opening into the central passage 37. Ports 38 and 39, however, are in different vertical planes, being offset from each other by an angle which, in the example illustrated, is one hundred and eighty degrees. The ports 22 and 23 are round, and the ports 38 and 39 are advantageously either round but of slightly larger diameter than ports 22 and 23, or of oval shape, as shown in Fig. 3, thereby obviating the need for accurate alignment of the rotor 36 with the body 20.

A stud 40 is secured to the upper portion of rotor 36 by means of a pin 41 and passes to the outside of cap 27 through a packing gland consisting of a packing 42, a follower ring 43, a washer 44, and nuts 45 held in place by a cotter pin 46.

In order to limit the rotary movement of the rotor 36, in this case to ninety degrees in either direction from the neutral position shown in Fig. 3, there is provided a projection 47 on the rotor which, upon movement through ninety degrees in either direction, comes up against a stationary stop 48 integral with the cap 27.

Secured to the lower end of the rotor 37 by means of a screw thread and two short pins 51 is a pipe 50 which is in communication with the central passage 37 and extends downwardly into and beyond the end of pipe 32 through the hollow closure 35, a stuffing box being provided by a packing 52, a gland 53 and a lock nut 54. The lower portion of pipe 50 is retained in a steadying bearing 56 which, by means of screws 57, is secured to a bracket 58 welded to the tank 10. Near the end of pipe 50 there is provided therein a valve 59.

A handle 60 is secured to the pipe 50 by means of a set screw 61 to permit rotation of pipe 50, and with it the rotor 36, within the limits provided by the projection 47 and the stationary stop 48.

In operation of the apparatus water and chemical solution enter through pipes 12 and 13, flow upwardly through the bed 19 of granular contact material and the softened water passes to a point of use via fitting 16 and pipe 17. The body 20 is so located within the tank that the elevation of ports 22 and 23 coincides with what is considered the desirable maximum and minimum level of contact material.

As operation of the device continues the granules in the bed 19 grow so that their upper level rises. The operator may readily ascertain at any time when they have built up to the desirable upper level by rotating the handle 60 in a counterclockwise direction (when looking downwardly) through an angle of ninety degrees. This brings port 38 into registry with port 22, and upon opening valve 59, a discharge from the interior of tank 10 takes place through pipe 50. When this discharge is merely water the operator knows that the granular material has not as yet built up to the level of port 22. On the other hand, when the discharge is a mixture of water and granules he knows that the upper level has been reached. He thereupon opens valve 15 to discharge through the drain 14 the coarsest granular material which is near the bottom of tank 10.

To determine when sufficient granular material has been discharged through valve 15 and drain pipe 14, the operator merely needs to turn the handle 60 clockwise through an angle of one hundred and eighty degrees, i. e. ninety degrees in a clockwise direction from the neutral position shown in the drawings. This brings port 39 into registry with port 23. When the discharge through pipe 50 is a mixture of water and granules, this indicates that the contact material is still above the desired minimum level. When the discharge is only water, this indicates that the desired low level has been reached. Thereupon, the handle 60 is returned to the neutral position shown in the drawings, and valves 15 and 59 are closed. A relatively small amount of fresh contact material of finer grain size may then be added to the bed 19 through the fitting 16 upon removal of the plug 18.

It is important whenever operating this device that the rotor 36 be turned to its neutral position in which both its ports 38 and 39 are out of registry with the stationary ports 22 and 23 respectively, before the valve 59 is closed. The leakage past the loosely fitting rotor then causes all granular material within the central passage 37 and the pipe 50 to be flushed out. If this is not done and granular material is allowed to stand within these passages, it will become packed so that when the valve 59 is opened, no discharge of granular material takes place. However, by following the foregoing precaution, granular material can only enter into the relatively shallow ports 22 and 23 during standing and such small amounts are readily flushed from said ports as soon as flow is established by appropriate turning of the rotor 36 and opening of valve 59.

If the rotor 36 were made so as to fit tightly against the ports 22 and 23, there would be no leakage past the rotor when it is in its neutral position, and valve 59 could then be omitted. I find it more advantageous, however, to make the rotor loosely fitting, as described above, and to provide a shutoff valve 59 in pipe 50.

My device is, of course, not restricted to use in connection with an apparatus for softening water such as has been described, but may be used for the sampling of any granular material used as a contact material for the treatment of liquids.

When it is desired merely to ascertain whether the contact material is above or below a given level, only a single port need be provided in the body and the rotor. On the other hand, three or more corresponding pairs of ports may be provided in the body and the rotor at different levels, those in the rotor being arranged in different vertical planes, e. g. 45 or 60 degrees apart, when it is desired to sample the bed of contact material at three or more different elevations.

To move the ports into and out of registry, the rotor 36 could be modified so as to be axially shiftable in which case, a single rotor port could be moved into registry with either of the two body ports. However, I find that rotational movement is preferable.

While I have shown and described what I consider the preferred form of my invention, modifications may be made without departing from the spirit of my invention and reference is, therefore, made to the appended claims for a definition of the scope of my invention.

What I claim is:

1. In apparatus for treating liquids comprising a tank containing granular contact material, a stationary hollow cylindrical member located within said tank, a port in said stationary member, a rotatable member within said stationary member, a port in said rotatable member, a tubular member connected with said rotatable member in communication with said last named port and extending to the outside of said tank, and operating means mounted on said tubular member on the outside of said tank for rotating said tubular member and with it said rotatable member so as to bring said last named port alternately into and out of registry with said first named port.

2. In the apparatus of claim 1, a shut-off valve on said tubular member on the outside of said tank.

3. In apparatus for treating liquids comprising a tank containing granular contact material, a stationary hollow cylindrical member located within said tank with its axis in a vertical plane, a pair of vertically spaced ports in said stationary member, a rotatable member within said stationary member, a pair of ports in said rotatable member, one of said last named ports being located in the same horizontal plane as one of said first named ports and the other of said last named ports being located in the same horizontal plane as the other of said first named ports, said ports of one of said pairs being located in different vertical planes, a tubular member connected with said rotatable member in communication with both said ports in said rotatable member, said tubular member extending to the outside of said tank, and operating means on said tubular member on the outside of said tank for rotating said tubular member and with it said rotatable member.

4. In the apparatus of claim 3, a projection on said rotatable member, and a stationary stop for limiting the rotational movement of said rotatable member.

5. In apparatus for treating liquids comprising a tank containing granular contact material, a stationary hollow cylindrical member located within said tank with its axis in a vertical plane, a pair of vertically spaced ports in said stationary member, a rotatable member loosely fitted within said stationary member, a pair of ports in said rotatable member, one of said last named ports being located in the same horizontal plane as one of said first named ports and the other of said last named ports being located in the same horizontal plane as the other of said first named ports, said ports of one of said pairs being located in different vertical planes, a tubular member connected with said rotatable member in communication with both said ports in said rotatable member, said tubular member extending to the outside of said tank, operating means on said tubular member on the outside of said tank for rotating said tubular member and with it said rotatable member, and a shut-off valve on said tubular member on the outside of said tank.

6. In apparatus for treating liquids comprising a tank containing granular contact material, a stationary hollow cylindrical member located within said tank with its axis in a vertical plane, two vertically spaced ports in said stationary member, a rotatable member within said stationary member, a central passage in said rotatable member, two ports in said rotatable member opening into said central passage, one of said last named ports being located in the same horizontal plane as one of said first named ports and the other of said last named ports being located in the same horizontal plane as the other of said first named ports, said ports in said rotatable member being located in different vertical planes, a tubular member connected with said rotatable member and in communication with said central passage, said tubular member extending to the outside of said tank, and operating means on said tubular member on the outside of said tank for rotating said tubular member and with it said rotatable member.

CHARLES S. SALVESEN.

REFERENCES CITED

The following references are of record in the file of this patent:

UNITED STATES PATENTS

| Number | Name | Date |
|---|---|---|
| 1,163,451 | Polmann | Dec. 7, 1915 |
| 2,240,182 | Guldner, Jr., et al. | Apr. 29, 1941 |
| 2,259,717 | Zentner | Oct. 21, 1941 |
| 2,355,069 | Green | Aug. 8, 1944 |
| 2,365,293 | Robinson | Dec. 19, 1944 |